United States Patent
Fusconi et al.

(10) Patent No.: US 12,365,388 B2
(45) Date of Patent: Jul. 22, 2025

(54) CONTROLLER AND METHOD FOR GENERATION OF STEERING OVERLAY SIGNAL

(71) Applicant: JAGUAR LAND ROVER LIMITED, Coventry (GB)

(72) Inventors: Denis Fusconi, Coventry (GB); Robyn Caldwell, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 209 days.

(21) Appl. No.: 18/044,534

(22) PCT Filed: Sep. 9, 2021

(86) PCT No.: PCT/EP2021/074831
§ 371 (c)(1),
(2) Date: Mar. 8, 2023

(87) PCT Pub. No.: WO2022/053564
PCT Pub. Date: Mar. 17, 2022

(65) Prior Publication Data
US 2023/0365192 A1 Nov. 16, 2023

(30) Foreign Application Priority Data
Sep. 9, 2020 (GB) ...................................... 2014176

(51) Int. Cl.
*B62D 15/02* (2006.01)
(52) U.S. Cl.
CPC .................. *B62D 15/025* (2013.01)
(58) Field of Classification Search
CPC .............................. B62D 15/025; B60W 30/12
See application file for complete search history.

(56) References Cited

U.S. PATENT DOCUMENTS 7,893,819 B2 * 2/2011 Pfeiffer ................ B62D 15/029
340/435
8,457,868 B2 6/2013 Tange et al.
(Continued)

FOREIGN PATENT DOCUMENTS

DE 102005003178 A1 7/2006
EP 3495240 A1 6/2019
(Continued)

OTHER PUBLICATIONS

Great Britain Intellectual Property Office, Combined Search and Examination Report under Sections 17 and 18(3) Issued in Application No. GB2014176.8, Jul. 26, 2021, 6 pages.
(Continued)

*Primary Examiner* — Xiao En Mo
(74) *Attorney, Agent, or Firm* — McCoy Russell LLP (57) ABSTRACT

Aspects of the disclosure relate to a control system and a method for controlling generation of a steering wheel overlay signal to control positioning of a host vehicle. The control system is configured to receive a curvature of a lane of travel. The control system is configured to determine a position of the host vehicle in relation to at least one boundary of the lane of travel; and determine a minimum clearance between the host vehicle and the at least one boundary in dependence based at least in part on the curvature of the lane of travel. If the host vehicle is determined to be closer to the at least one boundary than the minimum clearance, a steering intervention is implemented and the control system generates a steering wheel overlay signal for maintaining the host vehicle within the lane of travel.

20 Claims, 8 Drawing Sheets

(56) References Cited

U.S. PATENT DOCUMENTS

| | | | |
|---|---|---|---|
| 9,090,279 | B2 | 7/2015 | Buerkle et al. |
| 2004/0262063 | A1 | 12/2004 | Kaufmann et al. |
| 2020/0010085 | A1* | 1/2020 | Ohmura .............. B60W 50/082 |

FOREIGN PATENT DOCUMENTS

| | | | |
|---|---|---|---|
| JP | 2015197794 | A | 11/2015 |
| WO | 2011110156 | A2 | 9/2011 |
| WO | 2020133987 | A1 | 7/2020 |

OTHER PUBLICATIONS

ISA European Patent Office, International Search Report and Written Opinion Issued in Application No. PCT/EP2021/074831, Dec. 23, 2021, WIPO, 13 pages.

Great Britain Intellectual Property Office, Examination Report under Sections 18(3) Issued in Application No. GB2014176.8, Nov. 7, 2022, 5 pages.

\* cited by examiner

CONTROLLER AND METHOD FOR GENERATION OF STEERING OVERLAY SIGNAL

CROSS REFERENCE TO RELATED APPLICATIONS

The present application is a U.S. National Phase of International Application No. PCT/EP2021/074831 entitled "CONTROLLER AND METHOD FOR GENERATION OF STEERING OVERLAY SIGNAL," and filed on Sep. 9, 2021. International Application No. PCT/EP2021/074831 claims priority to Great Britain Patent Application No. 2014176.8 filed on Sep. 9, 2020. The entire contents of each of the above-listed applications are hereby incorporated by reference for all purposes.

TECHNICAL FIELD

The present disclosure relates to the generation of a steering overlay signal. Aspects of the invention relate to a control system for generating a steering overlay signal, to a method for generating a steering overlay signal, to a vehicle, to computer software and a non-transitory computer-readable medium.

BACKGROUND

It is known to provide a vehicle, such as an automobile, with a lane keep assist system. Current lane keep assist systems trigger a steering intervention to bring the driver back to a lane if the vehicle approaches a lane boundary. However, the natural driving position of the vehicle in the lane may vary depending on road conditions. This may cause the triggering of undesired steering interventions, causing inconvenience to the driver.

It is an aim of the present invention to address one or more of the disadvantages associated with the prior art.

SUMMARY OF THE INVENTION

Aspects and embodiments of the invention provide a control system, a control system, a vehicle, a method, computer software and a non-transitory computer-readable medium as claimed in the appended claims.

According to an aspect of the present invention there is provided a control system for controlling generation of a steering wheel overlay signal to control positioning of a host vehicle, the control system comprising one or more controller. The control system is configured to: receive a curvature of a lane of travel; determine a position of the host vehicle in relation to at least one boundary of the lane of travel; determine intervention criteria for the position of the host vehicle in dependence on the curvature of the lane of travel; and generate a steering wheel overlay signal for maintaining the host vehicle within the lane of travel in dependence on the position of the host vehicle meeting the intervention criteria. The intervention criteria may be a position in the lane of travel or a range of positions in the lane of travel. Advantageously, the condition for generating the steering wheel overlay signal may be varied depending on the curvature of the road, thereby allowing different attentive driving behaviour on curved roads to be accounted for and reducing unwanted steering interventions.

According to another aspect of the present invention there is provided a control system for controlling generation of a steering wheel overlay signal to control positioning of a host vehicle, the control system comprising one or more controller. The control system is configured to: receive a curvature of a lane of travel; determine a position of the host vehicle in relation to at least one boundary of the lane of travel; determine a minimum clearance between the host vehicle and the at least one boundary in dependence on the curvature of the lane of travel; and generate a steering wheel overlay signal for maintaining the host vehicle within the lane of travel in dependence on the position of the host vehicle being determined to be closer to the at least one boundary than the minimum clearance. Advantageously, the vehicle may be able to travel closer to the lane boundary without generation of the steering wheel overlay signal depending on the curvature of the road, thereby allowing different attentive driving behaviour on curved roads to be accounted for and reducing unwanted steering interventions.

Optionally, the control system may be configured to determine the curvature of the lane of travel in dependence on image data and/or sensor data of an environment of the vehicle. Optionally, the curvature may be obtained from digital map data indicative of the environment of the vehicle.

According to some embodiments, the control system is configured to determine the minimum clearance such that it is reduced in dependence on the curvature of the lane of travel increasing. The curvature of the lane of travel is defined such that a higher curvature corresponds to a tighter curve. Beneficially, reducing the minimum clearance as the curvature increases allows the host vehicle to follow the lane boundary more closely for tighter curves, which may feel more comfortable for the user, without triggering an unwanted steering intervention.

Optionally, the control system is configured to determine a first boundary and a second boundary of the lane of travel. The first boundary and the second boundary may define opposing sides of the lane of travel. For a road having a non-zero curvature, i.e. a non-straight road, the first boundary may be an inner boundary of the lane of travel and the second boundary may be an outer boundary of the lane of travel. The inner boundary defines the boundary of the lane of travel closest to the center of curvature about which the lane is curved. The outer boundary defines the boundary of the lane of travel farther from the center of curvature. The control system may be configured to determine a first minimum clearance relative to the outer boundary and a second minimum clearance relative to the inner boundary, wherein the first minimum clearance is greater than the second minimum clearance. Advantageously, a driver of the vehicle may be able to keep the vehicle closer to the inner boundary of the curve whilst taking a corner without triggering a steering intervention, which may feel more natural for the driver. A larger first minimum clearance is determined for the outer boundary, such that a steering intervention may be triggered earlier if a driver drifts to the outer boundary of the curve to ensure that the steering intervention is still triggered appropriately if the driver is inattentive.

In some embodiments, the control system is configured to determine the or each minimum clearance in dependence on a lateral velocity of the host vehicle within the lane of travel. That is, if the control system determines a first and a second minimum clearance, the control system may be configured to determine each of the first minimum clearance and the second minimum clearance in dependence on the lateral velocity of the host vehicle. Advantageously, the lateral velocity of the vehicle may be an indication of an attentiveness of a driver and thus the minimum clearance(s) for triggering a steering intervention may be appropriately adjusted.

The control system may configured to determine the or each minimum clearance such that the or each minimum clearance is increased in dependence on the lateral velocity of the host vehicle increasing. Beneficially, this allows sufficient time for the steering overlay signal to be implemented to avoid the host vehicle departing from the lane of travel.

In some embodiments, the control system is configured to determine the or each minimum clearance using a data structure storing lateral velocity values and corresponding minimum clearance values. The data structure may in some embodiments be a look up table. The data structure may be stored in a data storage means accessible to the control system. Optionally, the data structure may store for each lateral velocity value or range a corresponding first minimum clearance value and second minimum clearance value for the outer and inner lane boundaries respectively.

Optionally, the control system is configured to select a first data structure if the curvature exceeds a predetermined threshold, and a second data structure if the curvature does not exceed the predetermined threshold. That is, the control system may use a first look up table if the lane of travel is classified as straight and a second look up table if the lane of travel is classified as curved. The control system may classify the lane as curved if the curvature exceeds the predetermined threshold and classify the lane as straight if the curvature does not exceed the predetermined threshold. Advantageously, curvature specific minimum clearance(s) may be readily obtained by looking up the lateral velocity of the vehicle in the relevant look up table.

Optionally, the control system may be configured to select a third data structure if curvature exceeds a second higher predetermined threshold. Advantageously, the minimum clearance(s) may be readily further tailored to account for straight lanes, slightly curved lanes and very curved lanes.

The control system may be configured to control generation of the steering wheel overlay signal to steer the host vehicle toward a predetermined distance from the at least one boundary. Optionally, the predetermined distance corresponds to at least the minimum clearance for the at least one boundary. Optionally, the control system is configured to remove the steering wheel overlay signal in dependence on the host vehicle being at least the predetermined distance from the at least one boundary. Advantageously, following the intervention the vehicle is left in a position at which a further intervention will not be triggered.

In some embodiments, the control system is configured to determine the or each boundary of the lane of travel by identifying a road marking or a road edge. Advantageously, both demarcated lanes and physical edges may be detected.

According to a further aspect, there is provided a vehicle comprising a control system as described above.

According to another aspect of the invention, there is provided a method for controlling generation of a steering wheel overlay signal to control positioning of a host vehicle, the method comprising: receiving a curvature of a lane of travel; determining a position of the host vehicle in relation to at least one boundary of the lane of travel; determining a minimum clearance between the host vehicle and the at least one boundary in dependence on the curvature of the lane of travel; and generating a steering wheel overlay signal for maintaining the host vehicle within the lane of travel in dependence on the position of the host vehicle being determined to be closer to the at least one boundary than the minimum clearance.

According to another aspect of the invention, there is provided a non-transitory computer-readable medium having a set of instructions stored therein which, when executed, cause a processor to perform the method as described above.

According to another aspect of the invention, there is provided software that, when executed, is arranged to perform the method above. A method as claimed in claim 12, comprising determining the minimum clearance such that it is reduced in dependence on the curvature of the lane of travel increasing.

Optionally, the method may comprise:
  determining an inner boundary of the lane of travel and an outer boundary of the lane of travel; and
  determining a first minimum clearance relative to the outer boundary and a second minimum clearance relative to the inner boundary;
  wherein the first minimum clearance is greater than the second minimum clearance.

Optionally, the method may comprise determining the or each minimum clearance in dependence on a lateral velocity of the host vehicle within the lane of travel.

Optionally, the method may comprise determining the or each minimum clearance such that the or each minimum clearance is increased in dependence on the lateral velocity of the host vehicle increasing.

Optionally, the method may comprise determining the or each minimum clearance using a data structure storing lateral velocity values and corresponding minimum clearance values.

Optionally, the method may comprise selecting a first data structure if the curvature exceeds a predetermined threshold, and a second data structure if the curvature does not exceed the predetermined threshold.

Optionally, the method may comprise controlling generation of the steering wheel overlay signal to steer the host vehicle toward a predetermined distance from the at least one boundary.

Optionally, the method may comprise removing the steering wheel overlay signal in dependence on the host vehicle being at least the predetermined distance from the at least one boundary.

Optionally, the method may comprise determining the or each boundary of the lane of travel by identifying a road marking or a road edge.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A control system 1 in accordance with an embodiment of the present invention will now be described with reference to the accompanying figures. The control system 1 is installed in a vehicle 2, referred to herein as a host vehicle 2. The host vehicle 2 in the present embodiment is an automobile, such as a wheeled vehicle, but it will be understood that the control system 1 may be used in other types of land vehicle. The host vehicle 2 is described herein with reference to a reference frame comprising a longitudinal axis X, a transverse axis Y and a vertical axis Z. The host vehicle 2 has a longitudinal centreline CL extending along the longitudinal axis X.

Figure 1:
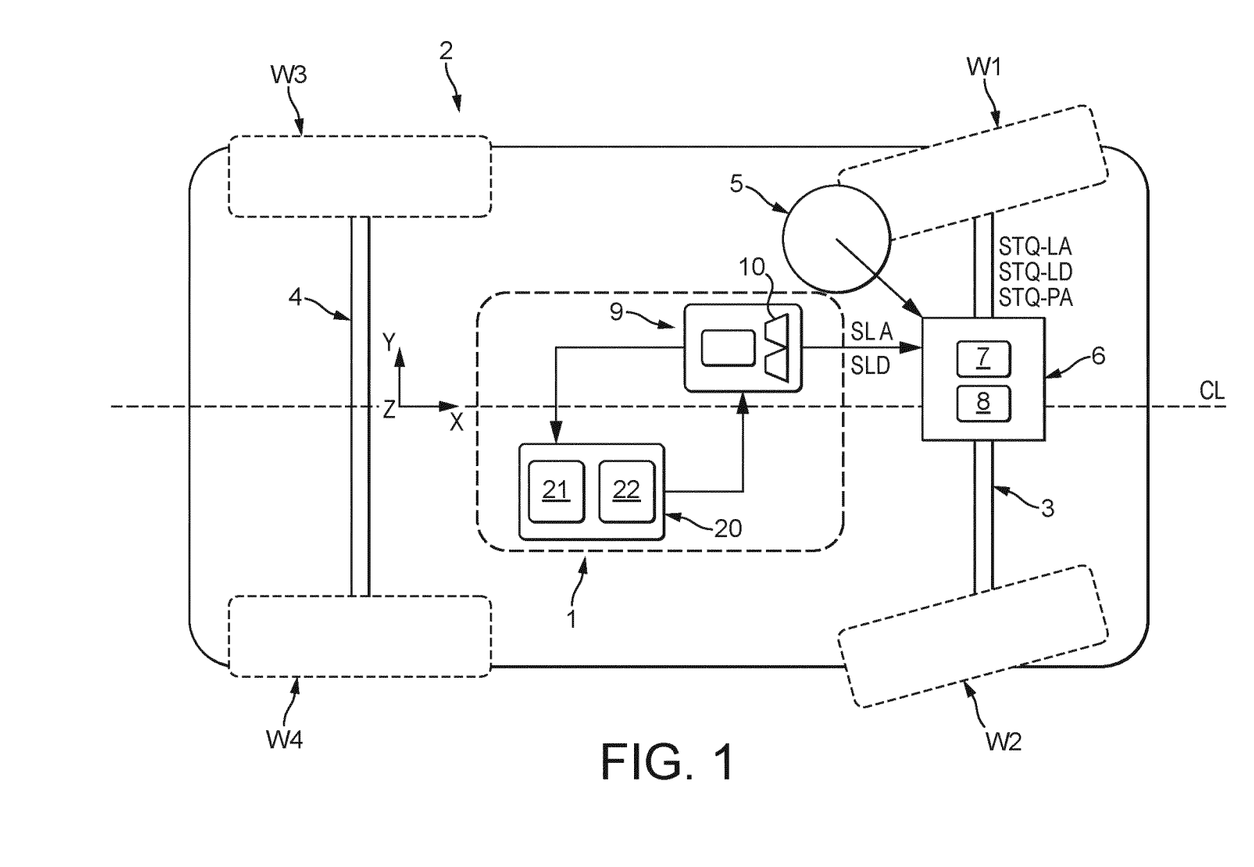
FIG. 1 shows a schematic representation of a host vehicle incorporating a control system in accordance with an embodiment of the present invention.

As illustrated in FIG. 1, the host vehicle 2 comprises four (4) wheels W1-4. The wheels W1-4 are provided on front and rear axles 3, 4. As illustrated in FIG. 1, the first and second wheels W1, W2 provided on the front axle 3 are steerable to control a direction of travel of the host vehicle 2. A driver-operated steering wheel 5 is provided for controlling a steering angle α of the first and second wheels W1, W2 is provided on the front axle 3.

A power assist steering system 6 is provided to generate a steering assist torque STQ-PA to supplement a steering torque applied to the steering wheel 5 by the driver. The power assist steering system 6 comprises a power assist steering controller 7; a torque sensor (not shown) for sensing the steering torque applied by the driver to the steering wheel 5; and a power assist steering actuator 8 for generating the steering assist torque STQ-PA. In the present embodiment, the power assist steering system 6 is an electric power assist steering system (EPAS) comprising an electromechanical actuator operable to generate the steering assist torque. Other types of power assist steering actuator 7 may be used, such as a hydraulic actuator.

The control system 1 comprises a lane departure warning system 9 for identifying when the host vehicle 2 is departing or about to depart the host vehicle lane of travel LT-n (i.e. the current lane in which the host vehicle 2 is travelling). As described herein, the lane departure warning system 9 is also suitable for identifying when the host vehicle 2 is approaching or traversing a physical limit or a boundary of the road R on which the host vehicle 2 is travelling. The physical limit or boundary of the road R is referred to herein as a road edge RE. The lane departure warning system 9 is configured to output a lane departure signal SLD upon determining that the host vehicle 2 is departing or at risk of departing the host-vehicle lane of travel LT-n or approaching or traversing the road edge RE. A detailed description of how it is determined that the host vehicle 2 is departing or at risk of departing the host vehicle lane of travel LT-n will be provided with reference to FIGS. 5 to 7B.

The power assist steering system 6 is configured to implement a lane keep assist (LKA) function for maintaining or returning the host vehicle 2 to the lane of travel LT-n. The control system 1 is configured to control the power assist steering system 6 to generate a lane assist steering overlay STQ-LD in dependence on the lane departure signal SLD. The lane assist steering overlay STQ-LD in the present embodiment comprises or consists of a lane assist steering torque STQ-LD. The lane assist steering torque STQ-LD is applied as a steering wheel torque overlay to the steering assist torque STQ-PA generated by the power assist steering system 6. The lane assist steering torque STQ-LD acts to steer the host vehicle 2 to return to the lane of travel LT-n or avoid departing from the lane of travel LT-n.

Further to maintaining or returning the host vehicle 2 in the lane of travel, the control system 1 may be configured to continue the intervention to steer the host vehicle to a target position in the lane of travel LT. The lane departure warning system 9 is configured to output an intra-lane signal SLA comprising a target position and/or target trajectory $α_T$ of the host vehicle 2 in the host-vehicle lane of travel LT. The control system 1 is then configured to control the power assist steering system 6 to generate an intra-lane steering signal STQ-LA in dependence on the intra-lane signal SLD. The intra-lane steering signal STQ-LA in the present embodiment comprises or consists of an intra-lane steering torque STQ-LA. The steering torque request may comprise a torque request direction (+ve or −ve) and optionally also a torque request magnitude.

The lane departure warning system 9 comprises a sensor unit 10 and may comprise an image processing module 11. The sensor unit 10 in the present embodiment comprises an optical camera having a field of view extending forwards in front of the host vehicle 2. The sensor unit 10 may comprise one or more optical cameras, for example a stereo camera. Alternatively, or in addition, the lane departure warning system 9 may utilise other types of sensor, such as a radar system or a LIDAR system, to capture a representation of a region in front of the host vehicle 2. The sensor unit 10 in the present embodiment is located behind a rear-view mirror (not shown) provided at the top of the front windshield. Other mounting locations are possible, for example the sensor unit 10 may be provided behind or in a front grille of the host vehicle 2. The lane departure warning system 9 may optionally receive inputs from one or more vehicle systems, for example to determine if the driver has activated side indicators to signal an intended change the lane of travel LT-n. The lane departure warning system 9 may be configured to inhibit output of the lane departure signal SLD, for example if the driver activates the directional (side) indicators. The image processing module 11 receives image data captured by the sensor unit 10. The image data is processed to identify features of the road R on which the host vehicle 2 is travelling. The image data is also processed to detect the road edge RE, for example by identifying a transition or boundary between a road surface which may be relatively smooth (for example defined by asphalt, concrete or other surfacing material) and an adjacent surface which may be relatively rough (for example composed of one or more of the following: grass, mud, gravel, sand and snow). According to some embodiments the image data may be processed to determine a curvature of the lane of travel LT-n.

Figure 2:
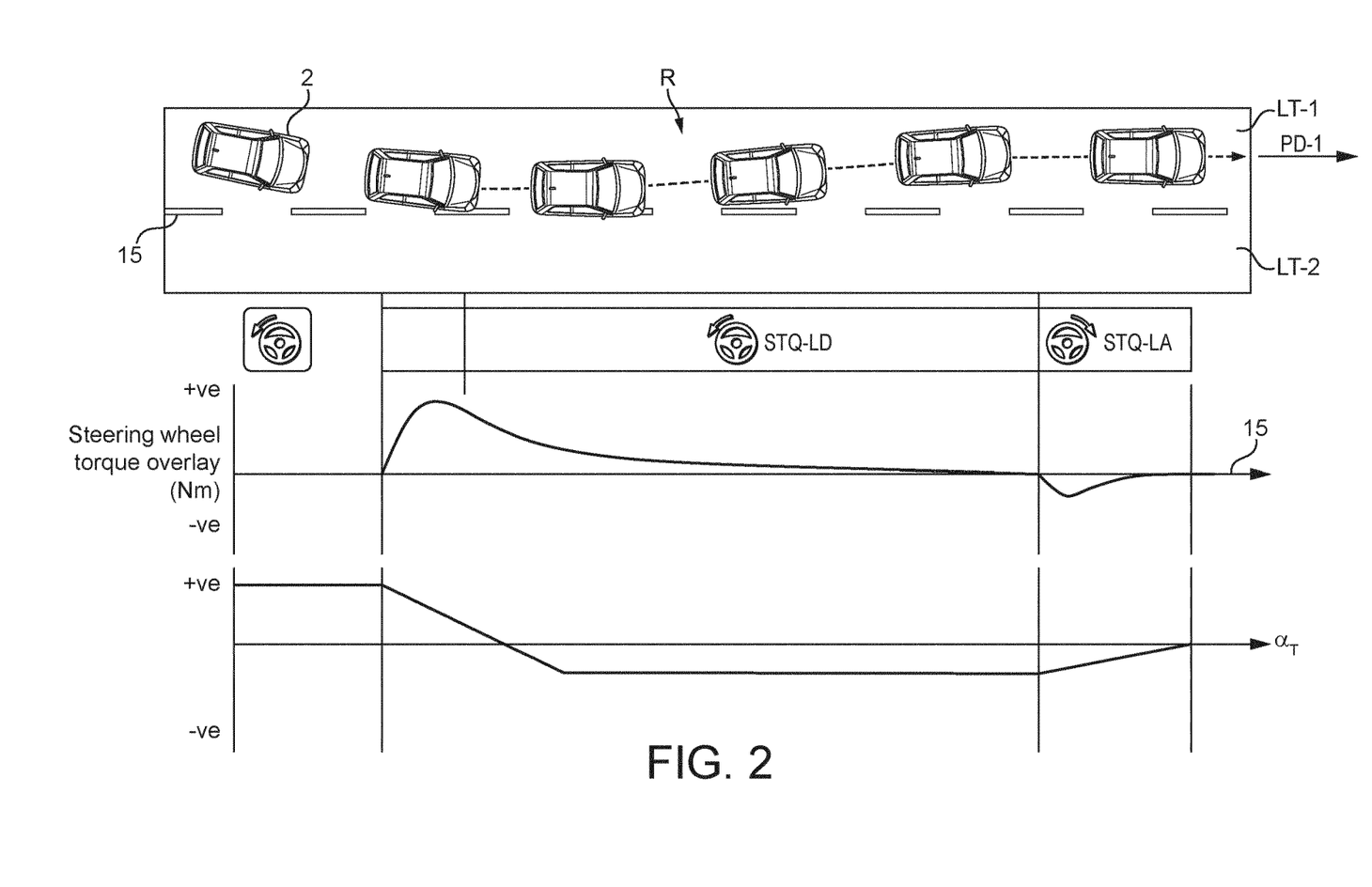
FIG. 2 illustrates generation of a lane keep assist torque and an intra-lane torque by the control system.

As illustrated in FIG. 2, the power assist steering system 6 is operable to implement a steering overlay intervention responsive to the determination that the host vehicle 2 is departing or at risk of departing the host vehicle lane of travel LT-n. The steering overlay intervention comprises a sequence of the lane keep assist function and the intra-lane function.

In use, the power assist steering system 6 may be controlled to generate a lane assist steering torque STQ-LD when the lane departure warning system 9 determines that the host vehicle 2 is departing or at risk of departing a lane of travel LT-n. The power assist steering system 6 may then be controlled to generate an intra-lane steering torque STQ-LA to be applied after the lane assist steering torque STQ-LD. The intra-lane steering torque STQ-LA may, for example, be applied in dependence on a determination that the host vehicle 2 has returned to the host-vehicle lane of travel LT-n.

The lane assist steering torque STQ-LD and the intra-lane steering torque STQ-LA are transmitted to the steering wheel 5 to provide a haptic signal to the driver of the host vehicle 2. The lane assist steering torque STQ-LD and the intra-lane steering torque STQ-LA are output to the steering wheel 5 in an appropriate direction to maintain the host vehicle 2 in the host-vehicle lane of travel LT-n. The magnitude of the lane assist steering torque STQ-LD and the intra-lane steering torque STQ-LA are controlled such that, if necessary, the driver can override the lane assist steering torque STQ-LD or the intra-lane steering torque STQ-LA, as will be described. The lane assist steering torque STQ-LD and the intra-lane steering torque STQ-LA may, for example, each have a maximum value of 3 Nm although other maximum values may be selected as appropriate.

Figure 3A:
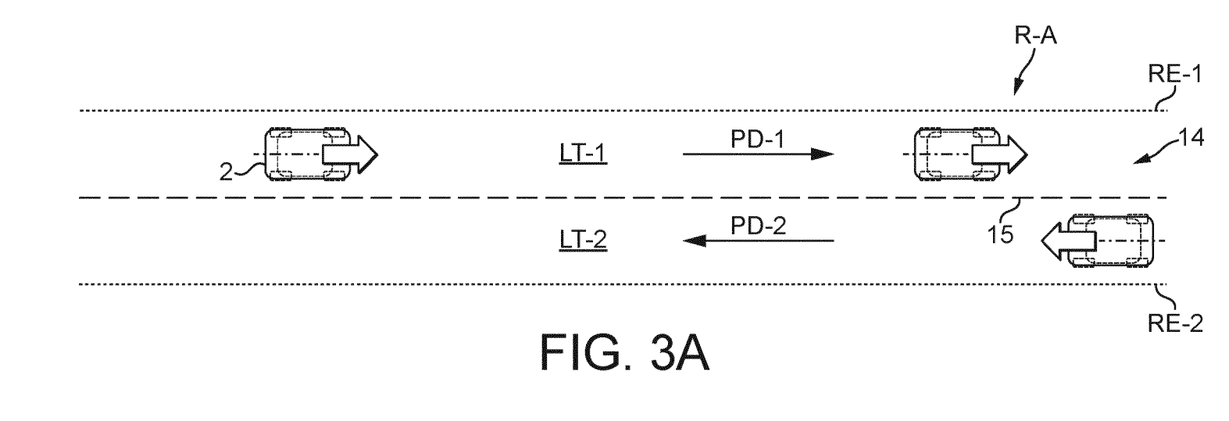
FIG. 3A illustrates the host vehicle travelling on a first section of road having a single lane of travel in each direction.
Figure 3B:
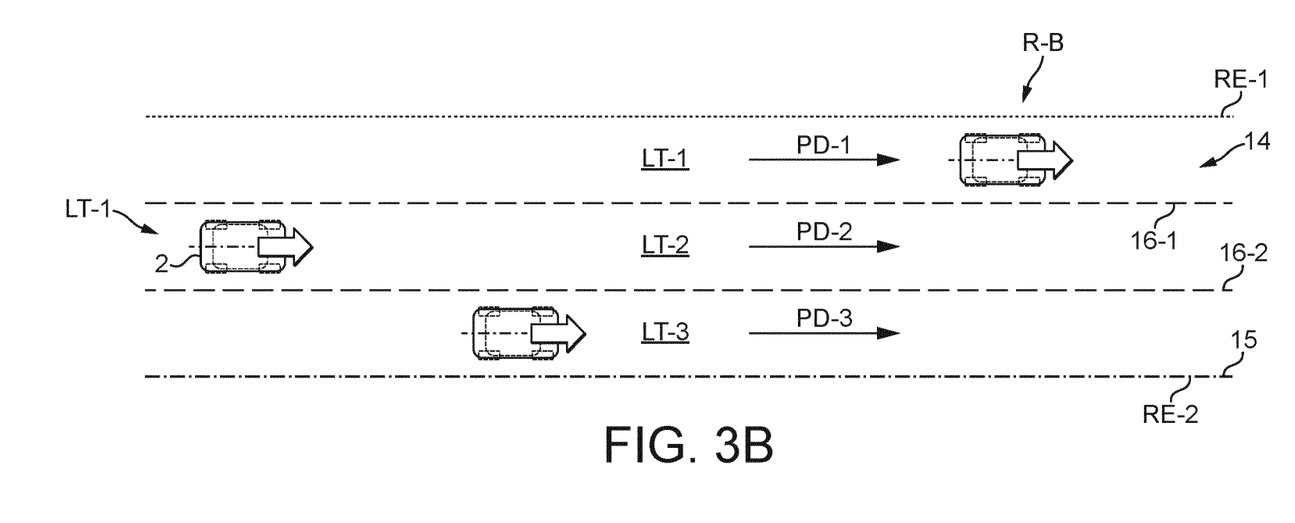
FIG. 3B illustrates the host vehicle travelling on a second section of road having a plurality of lanes of travel in each direction.

The control system 1 can be implemented when the host vehicle 2 is travelling on a road R having one or more lanes of travel LT-n. By way of example, a first road section R-A is shown in FIG. 3A; and a second road section R-B is shown in FIG. 3B.

The first and second road sections R-A, R-B can form part of the same road R or may be separate roads R. The first road section R-A is a two-lane road (also known as a "two-lane highway") having first and second lanes of travel LT-1, LT-2 for vehicles travelling in respective first and second directions. The second road section R-B consists of a multiple-lane road (also known as a "multiple-lane highway") having a two or more lane of travel LT-n for vehicles travelling in the same direction. It will be understood that the present invention is not limited to operation on roads having the features illustrated in the first and second road sections R-A, R-B. The first and second road sections R-A, R-B each comprise first and second road edges RE-1, RE-2. In the illustrated example, the first and second road edges RE-1, RE-2 mark the lateral extent of the metalled road surface. It will be understood that one or both of the first and second road edges RE-1, RE-2 may comprise a barrier or partition member, for example separating lanes of a dual carriageway (also known as a "divided highway"). The first and second road sections R-A, R-B may also comprise road markings (denoted herein generally by the reference numeral 14). The first road section R-A has road markings 14 comprising a central road marking 15. As shown in FIG. 3B, the central road marking 15 comprises a centre line of the second road section R-B. The road markings 14 on the second road section R-B comprise one or more lane markings 16-$n$ representing a boundary of a lane of travel LT-n for vehicles travelling in the same direction or in opposite directions. The one or more lane markings 16-$n$ may comprise lane lines. In the illustrated arrangement, the second road section R-B comprises first and second lane markings 16-1, 16-2 for demarcating first, second and third lanes of travel LT-1, LT-2, LT-3. The central road marking 15 and/or the one or more lane marking(s) 16-$n$ may each comprise a continuous line (not shown) or an interrupted line (shown in FIGS. 3A and 3B). The road marking(s) 14 may each comprise one line or multiple lines, for example in the form of a single line or a double line. The central road marking 15 typically differentiates between sections of the first or second road section R-A, R-B intended for travel in opposite directions. Alternatively, or in addition, the road marking(s) 14 may comprise edge lines to indicate an edge of an inboard lane; the edge lines may be separated from the associated first or second road edge RE-1, RE-2. The first road section R-A shown in FIG. 3A includes central road markings 15 and lane markings defining a plurality of lanes of travel LT-n.

The lane departure warning system 9 is operable to monitor the image data captured by the sensor unit 10 at least substantially in real time. The image processing module 11 analyses the image data to identify the first road edge RE-1 and/or the second road edge RE-2. The image processing module 11 may, for example, identify changes in the contrast and/or colour of the image data which may be indicative of the first and/or second road edge RE-1, RE-2. Other image processing techniques may be used to identify the first and second road edges RE-1, RE-2. The image processing module 11 is configured also to identify any road markings 14 present on the road R. The image processing module 11 may, for example, utilise image processing techniques to identify continuous or interrupted lines extending in a forward direction (i.e. parallel to the centre line CL of the host vehicle 2). The image processing module 11 is configured to identify the central road markings 15 and the lane markings 16. If road markings 14 are identified, the image processing module 11 identifies the lane of travel LT-n in which the host vehicle 2 is currently travelling (referred to herein as the host-vehicle lane of travel LT-n). According to some embodiments, the image processing module 11 may identify a curvature of the lane of travel LT-n.

The image processing module 11 is configured to determine a principal axis PD of the lane of travel LT-n in which the host vehicle 2 is currently travelling. The principal axis PD represents a principal direction of travel for vehicles travelling in the lane of travel LT-n. The principal axis PD may be determined in dependence on one or more of the following: the first road edge RE-1, the second road edge RE-2, and the road marking(s) 14. The principal axis PD may, for example, be identified as a direction extending substantially parallel to the road edge RE-n, a central road marking 15 or a lane marking 16. The principal axis PD may be identified as a direction extending substantially parallel to a boundary of the lane of the travel LT-n which is closest to the host vehicle 2, for example closest to the centre line CL of the host vehicle 2). Alternatively, or in addition, the principal axis PD may be determined with reference to two or more features identified in the image data. For example, the principal axis PD may be determined as corresponding to a virtual centreline extending between a first road edge RE-1 and a central road marking 15; or a virtual centreline extending between first and second lane markings 16-1, 16-2. Alternatively, the principal axis PD may be offset from and extend parallel to a virtual centreline of the road R or the lane of travel LT-n. The image processing module 11 may optionally determine a centreline of the or each lane of travel LT-n. Alternatively, or in addition, the principal axis PD may be predefined, for example in map data.

The lane departure warning system 9 identifies the road marking 14 or road edge RE-1, RE-2 closest to the longitudinal centreline CL of the host vehicle 2. If the host vehicle 2 approaches or crosses the identified road marking 14 or road edge RE-1, RE-2, the lane departure warning system 9 determines that the host vehicle 2 is departing from the host-vehicle lane of travel LT-n. The lane departure warning system 9 then outputs the lane departure signal SLD. The lane departure signal SLD includes an indication of whether the host vehicle 2 is traversing the lane markings or road edge on a right-hand side or a left-hand side of the host vehicle 2. The power assist steering system 6 receives the lane departure signal SLD and is operable to generate the lane assist steering torque STQ-LD in a direction suitable for maintaining the host vehicle 2 in the host-vehicle land of travel LT-n.

Following application of the lane assist steering torque STQ-LD, the lane departure warning system 9 may output the intra-lane signal SLA. The power assist steering system 6 may then be controlled to generate the intra-lane steering torque STQ-LA to control the host vehicle 2 to a target position within the lane of travel LT-n (i.e. at a target lane position).

The intra-lane steering torque STQ-LA can be generated as a separate control function which is implemented upon completion of the lane assist steering torque STQ-LD, for example as a continuation of this function. In a variant, the intra-lane steering torque STQ-LA may be integrated into the lane assist steering torque STQ-LD.

The intra-lane steering torque STQ-LA may be generated to position the host vehicle 2 at least a predetermined distance D1 from a boundary of the lane of travel LT-n. The predetermined distance D1 may be defined relative to the centreline CL of the host vehicle 2 or relative to the side of the host vehicle 2 closest to the identified boundary. The boundary may, for example, correspond to the first or second road edge RE-1, RE-2 or a road marking 14. By way of example, the predetermined distance D1 is shown in relation to a first road edge RE-1 in the scenario illustrated in FIG. 4. Alternatively, the control system 1 may generate the intra-lane steering torque STQ-LA to position the host vehicle 2 centrally within the lane of travel LT-n. The intra-lane steering torque STQ-LA may be configured to position the host vehicle 2 at a mid-point between the first and second lane markings 16-1, 16-2 which define opposing sides of the lane of travel LT-n.

Figure 4:
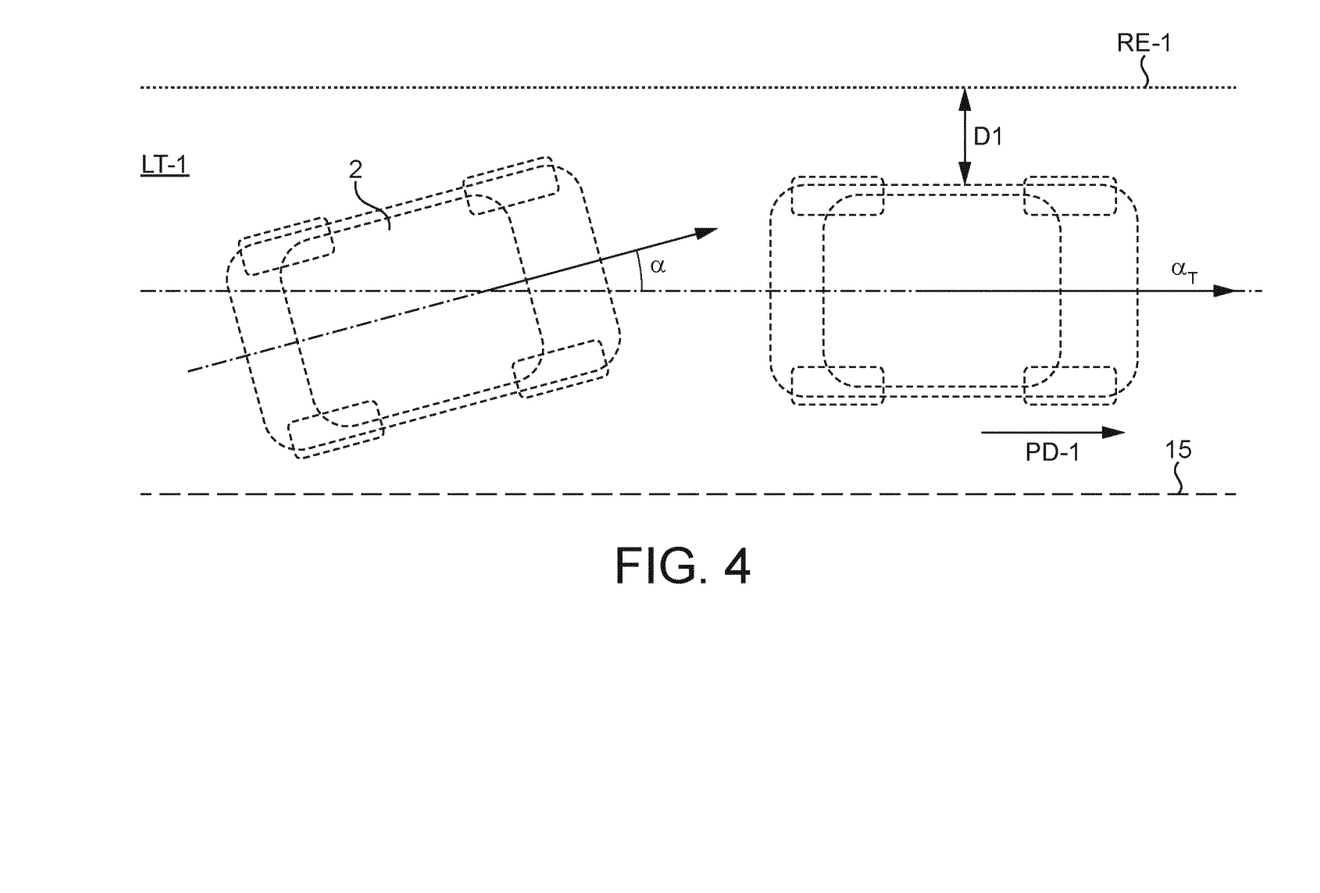
FIG. 4 illustrates the position and trajectory of the target vehicle in a lane of travel.

At least in certain embodiments, this may facilitate the transition to the scenario in which the host vehicle 2 is controlled exclusively by the driver. The intra-lane function is implemented by a steering wheel torque overlay comprising an intra-lane steering torque STQ-LA applied to the steering assist torque STQ-PA. In the arrangement illustrated in FIG. 2, the control system 1 is configured to generate the intra-lane steering torque STQ-LA following application of the lane assist steering torque STQ-LD. The intra-lane steering torque STQ-LA is generated to control the host vehicle 2 at least substantially to position the host vehicle 2 at a predefined position within the lane of travel LT-n. In the present embodiment, the intra-lane steering torque STQ-LA is also generated to control the host vehicle 2 at least substantially to align a trajectory $\alpha$ (or orientation) of the host vehicle 2 with a target trajectory $\alpha_T$. A target position and a target orientation for the host vehicle 2 are represented in FIG. 4 by a dashed (phantom) representation of the host vehicle 2. The target trajectory $\alpha_T$ in the present embodiment is substantially parallel to the principal axis PD of the lane of travel LT-n. The intra-lane steering torque STQ-LA is transmitted to the steering wheel 5 and provides a haptic signal to the driver. The intra-lane steering torque STQ-LA is output to the steering wheel 5 in an appropriate direction to control the trajectory $\alpha$ of the host vehicle 2 at least substantially to match the target trajectory $\alpha_T$. The intra-lane steering torque STQ-LA is generated in dependence on a comparison of a current trajectory $\alpha$ of the host vehicle 2 in relation to the principal axis PD.

To facilitate the transition to the host vehicle 2 being controlled by the driver, the control system 1 is configured to reduce or remove the magnitude of the intra-lane steering torque STQ-LA such that the steering wheel overlay is eventually removed. The condition for removal of the intra-lane steering torque STQ-LA may be such that the trajectory of the host vehicle is substantially close to the target trajectory $\alpha_T$, the position of the host vehicle is substantially close to the target position, or a lateral velocity of the vehicle is below a threshold such that the host vehicle is travelling substantially parallel in the lane of travel.

The above described steering overlay intervention is triggered when the control system 1 determines that the host vehicle is departing or at risk of departing the lane of travel LT-n. The host vehicle is determined to be at risk of departing the lane of travel LT-n if the distance between the host vehicle 2 and the identified boundary 15 is below a minimum clearance 400. An example minimum clearance 400 is illustrated in FIG. 4.

The minimum clearance 400 may defined as a distance from the boundary 15, for example 30 cm. Alternatively, the minimum clearance 400 may be defined as a proportion of a width of the lane of travel LT-n, i.e. within the rightmost or leftmost 10% of the width of the lane. It will be appreciated that these values are merely illustrative.

An appropriate minimum clearance 400 may be determined as the vehicle is travelling and may vary in dependence on vehicle parameters and/or lane parameters. In particular, the minimum clearance 400 may be determined by the control system 1 in dependence on a curvature of the lane of travel LT-n.

Figure 5:
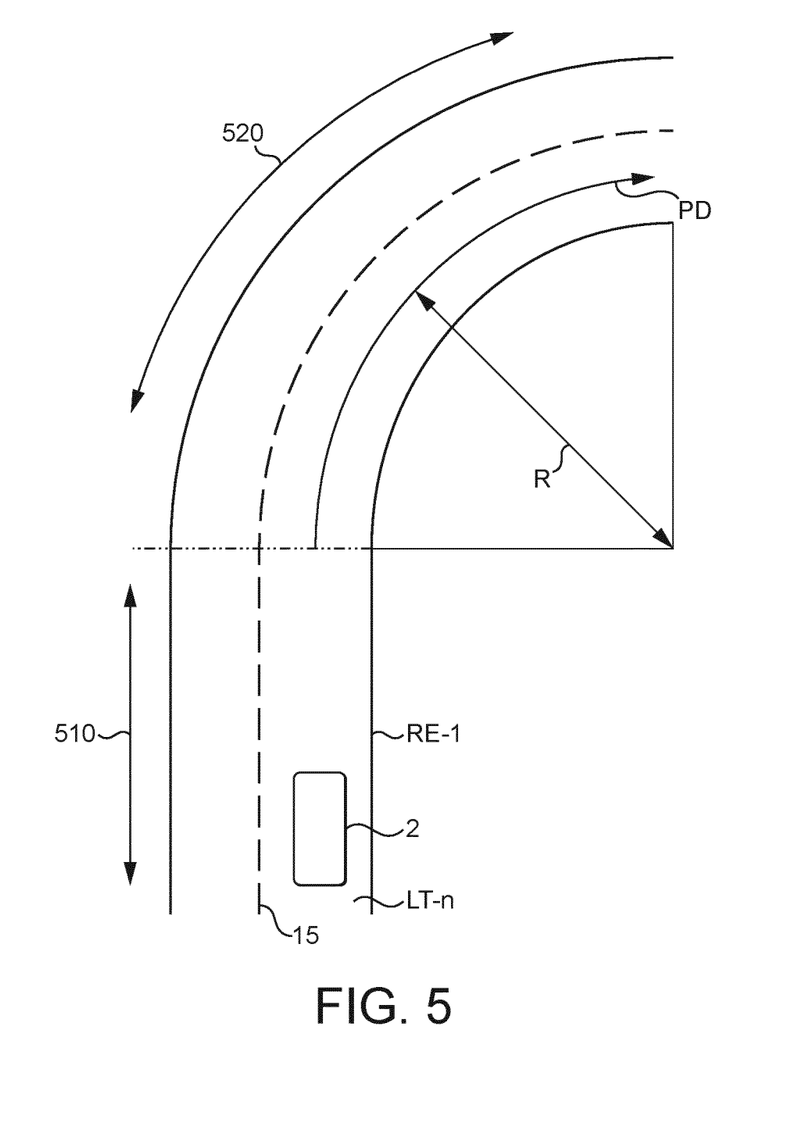
FIG. 5 illustrates curvature of a lane of travel.

With reference to FIG. 5, the curvature of the lane of travel LT-n is indicative of how sharply the vehicle must turn to stay within the lane of travel LT-n. A higher curvature is indicative of a sharper bend. The curvature may be defined in relation to a radius R of an arc carved by the principal axis PD of the lane LT-n or by either boundary 15, RE-1 of the lane LT-n.

FIG. 5 illustrates a lane of travel LT-n having a first straight portion 510 and a second curved portion 520. That is, the curvature of the lane of travel LT-n changes as the vehicle proceeds along the road. The curvature of the straight portion 510 may be considered substantially close to zero. The curvature of the curved portion 520 may be considered non-zero and may be quantified as some function of the radius R of the principal axis PD. For example, the curvature may be quantified as an inverse of the radius R, however other formulations may be envisaged in the invention is not limited in this respect. The minimum clearance 400 for the purpose of triggering a steering overlay intervention may be determined in dependence on the curvature of the lane of travel LT-n.

Figure 6A:
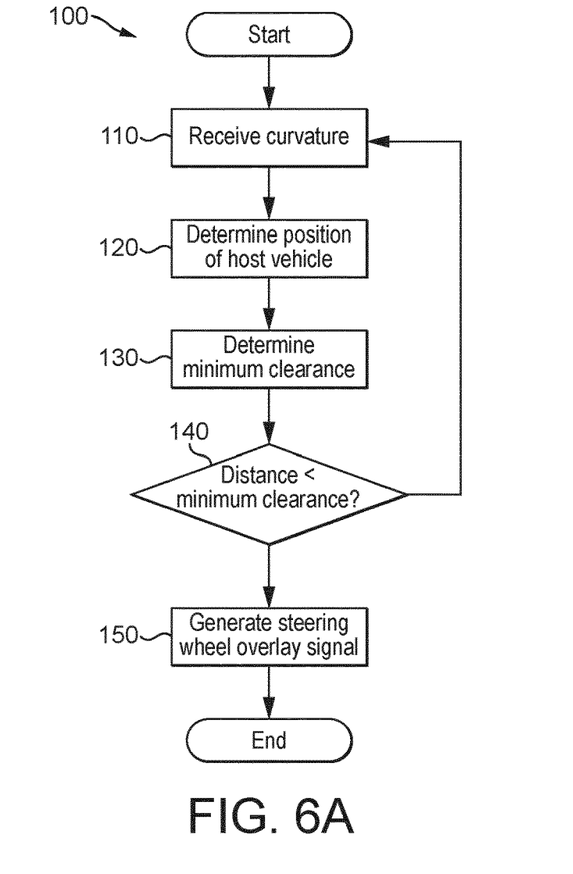
FIG. 6A shows a block diagram illustrating a method according to an embodiment of the present invention.

A method 100 of generating a steering wheel overlay signal to implement a steering overlay intervention is illustrated in FIG. 6A. In particular, the method 100 is performed by the control system 1 to determine whether to trigger a steering overlay intervention.

The method 100 comprises a block 110 of receiving an indication of a curvature of the lane of travel LT-n of the host vehicle 2. The curvature may be determined by the image processing module 11 in dependence on the identified lane LT-n in the image data. Alternatively, the curvature may be determined from map data indicative of the lane of travel LT-n. The map data may be stored in a memory accessible to the control system 1 and may comprise an indication of the curvature of each segment of the lane of travel LT-n.

The method 100 comprises a block 120 of determining a position of the host vehicle in relation to at least one boundary of the lane of travel. Block 120 may comprise identifying the or each boundary 15, RE-1 of the lane LT-n in dependence on image data of the host vehicle environment, as has been explained. Block 120 may then comprise determining a distance between the host vehicle and the or each boundary 15, RE-1.

The method 100 comprises a block 130 of determining a minimum clearance between the host vehicle and the identified boundary in dependence on the curvature of the lane of travel LT-n. If a first boundary 15 and a second boundary RE-1 are each identified, block 130 may comprise determining one minimum clearance applicable to each boundary, or a separate first minimum clearance for the first boundary 15 and a second minimum clearance for the second boundary RE-1.

Figure 6B:
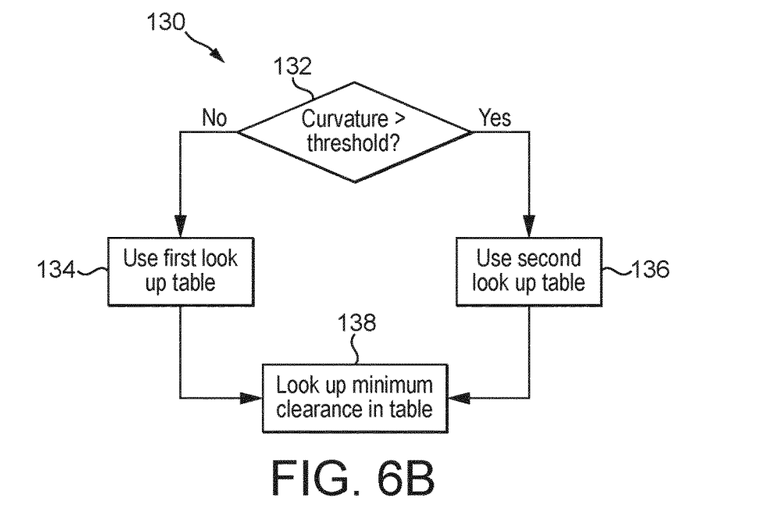
FIG. 6B shows a block diagram illustrating the determination of a minimum clearance value.

A more detailed illustration of block 130 according to an embodiment is illustrated in FIG. 6B.

The block 130 comprises a step 132 of determining whether the curvature of the lane of travel LT-n is above a curvature threshold. The curvature threshold may be predetermined. For example, the curvature threshold may correspond to a lane of travel with radius of curvature between 800-1500 m. As an illustrative example, the curvature threshold may be a curvature value corresponding to a radius of 1000 m. The curvature of the lane of travel LT-n may be determined to exceed the curvature threshold if the radius of the lane of travel LT-n is less than 1000 m. These curvature threshold values are merely illustrative, and it will be appreciated that the curvature threshold may be set to any appropriate level of curvature. If the curvature of the lane of travel LT-n is below the curvature threshold, the lane of travel LT-n may be classified as a straight lane. If the curvature of the lane of travel LT-n is above the curvature threshold, the lane of travel LT-n may be classified as a curved lane. For example, the lane of travel LT-n illustrated in FIG. 5 may be classified as straight during the first portion 510 and curved during the second portion 520. The curvature of the lane of travel LT-n may therefore vary from portion to portion depending on where the host vehicle 2 is located.

According to some embodiments, it may be determined whether the curvature of the lane of travel LT-n is above a second higher curvature threshold. If the curvature of the lane of travel LT-n exceeds a second higher curvature threshold, the lane of travel may be classified as being highly curved. In these embodiments, step 132 may thus comprise classifying a portion of the lane of travel LT-n as straight, curved or highly curved.

If the curvature of the lane of travel LT-n is below the curvature threshold, in step 134 the control system 1 retrieves a first data structure. In some embodiments, the first data structure is a first look up table. The first look up table comprises at least one minimum clearance value applicable to a straight road.

The first look up table may comprise a plurality of minimum clearance values. The plurality of minimum clearance values may each be associated with a lateral velocity or range of lateral velocities of the host vehicle 2. In particular, the minimum clearance values in the first look up table may increase with increasing lateral velocity of the host vehicle 2, to ensure sufficient time for the power assist steering system 6 to implement the lane assist steering torque STQ-LD to maintain or return the host vehicle to the lane of travel LT-n. An example first look up table according to one embodiment is illustrated below:

| Lateral velocity of vehicle (m/s) | Minimum clearance (cm) |
| --- | --- |
| 0-0.1 | 0 |
| 0.1-0.2 | 0 |
| 0.2-0.3 | 10 |
| 0.3-0.4 | 15 |
| 0.4-0.5 | 15 |
| 0.5-0.6 | 20 |
| 0.6-0.7 | 25 |

If the curvature of the lane of travel LT-n is above the curvature threshold, in step 136 the control system 1 retrieves a second data structure. In some embodiments, the second data structure is a second look up table. The second look up table comprises at least one minimum clearance value applicable to a curved road.

Step 136 may comprise determining whether the or each identified boundary is an inner boundary or an outer boundary of the lane of travel LT-n. In the example illustrated in FIG. 5, the inner boundary of the lane of travel LT-n is the road edge RE-1. The outer boundary of the lane of travel LT-n is the central road marking 15. The inner boundary of the lane of travel LT-n may be defined to be the boundary closest to a centre about which the lane is curved.

The second look up table may comprise a first portion for determining a first minimum clearance relative to the outer boundary 15 and a second portion for determining a second minimum clearance relative to the inner boundary RE-1. The first minimum clearance may be referred to as an outer minimum clearance, and the second minimum clearance may be referred to as an inner minimum clearance.

The first portion may comprise a plurality of outer minimum clearance values. The plurality of outer minimum clearance values may each be associated with a lateral velocity or range of lateral velocities of the host vehicle. The second portion may comprise a plurality of inner minimum clearance values. The plurality of inner minimum clearance values may each be associated with a lateral velocity or range of lateral velocities of the host vehicle.

In particular, the outer minimum clearance values may increase with increasing lateral velocity of the host vehicle. Optionally, the inner minimum clearance values relative to the inner boundary may also vary with increasing lateral velocity of the host vehicle, but in some embodiments the inner minimum clearance values may be uniform. In general, the inner minimum clearance values are reduced with respect to the outer minimum clearance values, to allow the driver to remain closer to the inside of the curve or overshoot the line as this may feel more natural to the driver. Furthermore, the inner minimum clearance values are reduced with respect to the minimum clearance values of the first look up table. Thus, on curved roads the driver may drive closer to an inner boundary of the curve compared to the same boundary on a straight portion without triggering a steering intervention.

An example second look up table according to one embodiment is illustrated below:

| Lateral velocity (m/s) | Outer minimum clearance (outer boundary) (cm) | Inner minimum clearance (inner boundary) (cm) |
| --- | --- | --- |
| 0-0.1 | −5 | −20 |
| 0.1-0.2 | 5 | −20 |
| 0.2-0.3 | 15 | −20 |
| 0.3-0.4 | 20 | −20 |
| 0.4-0.5 | 20 | −20 |
| 0.5-0.6 | 20 | −20 |
| 0.6-0.7 | 20 | −20 |

Figure 7A:
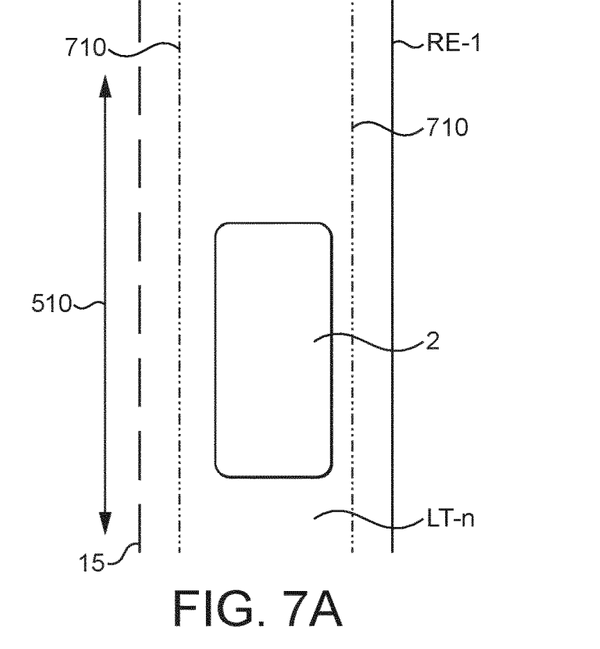
FIG. 7A illustrates minimum clearance from lane boundaries on a straight portion of road.
Figure 7B:
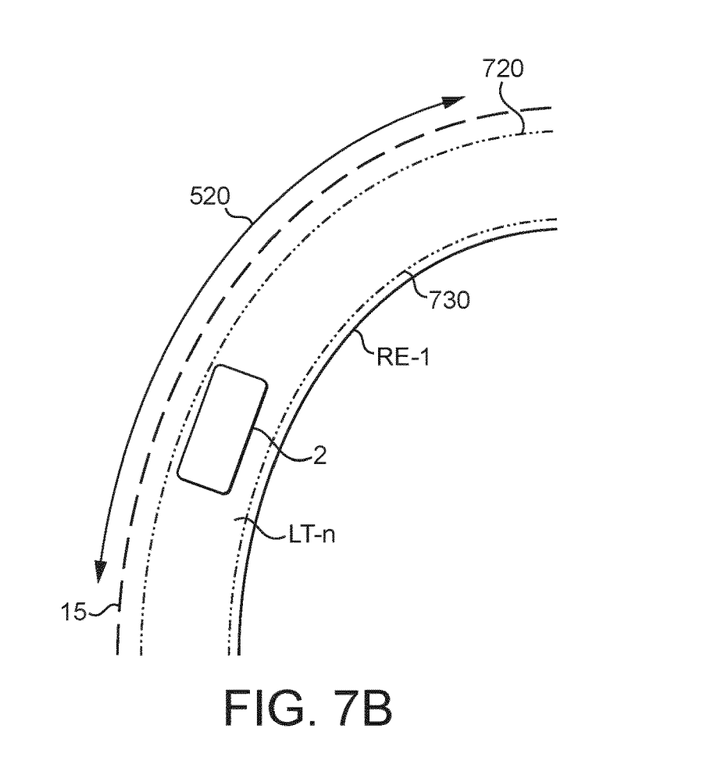
FIG. 7B illustrates minimum clearance from lane boundaries on a curved portion of road.

An illustrative example of minimum clearance values according to an embodiment is shown in FIGS. 7A and 7B. The illustrated minimum clearance values may be for a consistent lateral velocity of the host vehicle 2. FIG. 7A indicates an example minimum clearance 710 applicable to each boundary 15, RE-1 on a straight portion 510 of the lane of travel LT-n. The minimum clearance 710 is applicable to each boundary 15, RE-1.

FIG. 7B illustrates an example outer minimum clearance 720 applicable to an outer boundary 15 of a curved portion 720 of the lane LT-n, and an inner minimum clearance 730 applicable to an inner boundary RE-1 of a curved portion 720 of the lane LT-n.

In step 138, the control system is configured to look up an applicable minimum clearance for the host vehicle 2 in the appropriate look up table. The applicable minimum clearance may vary depending on the identified boundary and the lateral velocity of the host vehicle, as illustrated by the above look up tables. Step 138 may comprise determining the lateral velocity of the host vehicle in the lane of travel. The lateral velocity of the host vehicle may be defined as a rate of change of the distance between the host vehicle 2 and the identified boundary. If the first look up table is used, step 138 may then comprise looking up an applicable minimum clearance for the host vehicle 2. If the second look up table is used, step 138 may then comprise looking up an applicable outer minimum clearance for the outer boundary and/or an inner minimum clearance for the inner boundary of the lane of travel. Step 138 may comprise retrieving both values, or just the value for the boundary closest to the host vehicle 2.

For example, in the illustrated embodiment of FIG. 7B, step 132 may comprise determining that the curvature exceeds a curvature threshold, and the method will proceed to step 136. In step 136, the second look up table is retrieved. In step 138, it is determined that the lateral velocity is 0.1 m/s and the identified boundary RE-1 is an inner boundary of the curve. Thus, the applicable inner minimum clearance value in the second look up table may be determined to be 0 cm. Thus, the steering intervention will only be triggered if the host vehicle 2 begins to traverse the boundary RE-1.

It will be appreciated that in some embodiments, the first look up table and second look up table may be replaced with another suitable data structure accessible to the control system 1. In particular, they may be integrated into one larger data structure such as a relational database.

In block 140 of the method 100, it is determined whether the position of the host vehicle is closer to the identified boundary than the applicable minimum clearance. If the host vehicle is closer to the identified boundary, the method proceeds to block 150. In block 150 the control system is configured to implement a steering overlay intervention by generating a steering wheel overlay signal for maintaining the host vehicle within the lane of travel. A detailed description of the steering overlay intervention will be omitted here, but any suitable steering overlay intervention such as that described with reference to FIG. 2 may be caused to be implemented by the steering wheel overlay signal.

Figure 8:
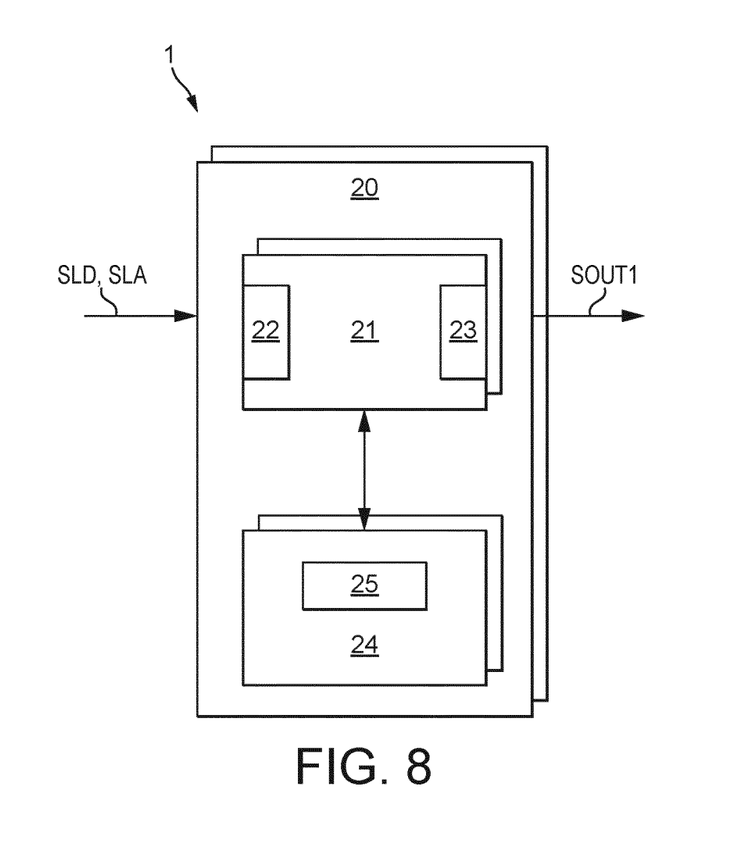
FIG. 8 is a schematic representation of the control system in accordance with an embodiment of the present invention.

With reference to FIG. 8, there is illustrated a simplified example of a control system 1 such as may be adapted to implement the method described herein. The control system 1 comprises one or more controllers 20 and is configured to control generation of a steering wheel overlay signal to control steering of a host vehicle 2. The control system 1 includes one or more controllers 20 and is configured to receive a curvature of a lane of travel LT-n. The control system 1 determines a position of the host vehicle in relation to at least one boundary 15, RE-1 of the lane of travel LT-n. The control system 1 determines a minimum clearance between the host vehicle and the at least one boundary in dependence on the curvature of the lane of travel LT-n. The control system 1 generates a steering wheel overlay signal for maintaining the host vehicle within the lane of travel in dependence on the position of the host vehicle being determined to be closer to the at least one boundary than the minimum clearance.

It is to be understood that the or each controller 20 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 20 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 20 to implement the control techniques described herein (including some or all of the functionality required for the method described herein). The set of instructions could be embedded in said one or more electronic processors of the controller 20; or alternatively, the set of instructions could be provided as software to be executed in the controller 20. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 8, the or each controller 20 comprises at least one electronic processor 21 having one or more electrical input(s) 22 for receiving one or more input signals SLD, SLA, and one or more electrical output(s) 23 for outputting one or more output signals SOUT1. The or each controller 20 further comprises at least one memory device 24 electrically coupled to the at least one electronic processor 21 and having instructions 25 stored therein. The at least one electronic processor 21 is configured to access the at least one memory device 24 and execute the instructions 25 thereon.

The, or each, electronic processor 21 may comprise any suitable electronic processor (e.g., a microprocessor, a microcontroller, an ASIC, etc.) that is configured to execute electronic instructions. The, or each, electronic memory device 24 may comprise any suitable memory device and may store a variety of data, information, threshold value(s), lookup tables or other data structures, and/or instructions therein or thereon. In an embodiment, the memory device 24 has information and instructions for software, firmware, programs, algorithms, scripts, applications, etc. stored therein or thereon that may govern all or part of the methodology described herein. The processor, or each, electronic processor 21 may access the memory device 24 and execute and/or use that or those instructions and information to carry out or perform some or all of the functionality and methodology describe herein.

The at least one memory device 24 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 20 have been described comprising at least one electronic processor 21 configured to execute electronic instructions stored within at least one memory device 24, which when executed causes the electronic processor(s) 21 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

The invention claimed is:

1. A control system for controlling generation of a steering wheel overlay signal to control positioning of a host vehicle, the control system comprising one or more controller, the control system configured to:
   receive a curvature of a lane of travel;
   determine a position of the host vehicle in relation to at least one boundary of the lane of travel;
   determine a minimum clearance between the host vehicle and the at least one boundary in dependence based at least in part on the curvature of the lane of travel; and
   generate the steering wheel overlay signal for maintaining the host vehicle within the lane of travel in dependence based at least in part on the position of the host vehicle being determined to be closer to the at least one boundary than the minimum clearance,
   wherein the control system is configured to determine the minimum clearance or each minimum clearance based at least in part on a lateral velocity of the host vehicle within the lane of travel.

2. The control system as claimed in claim 1, wherein the control system is configured to determine the minimum clearance such that it is reduced in dependence based at least in part on the curvature of the lane of travel increasing.

3. The control system as claimed in claim 1, wherein the control system is further configured to:
   determine an inner boundary of the lane of travel and an outer boundary of the lane of travel; and
   determine a first minimum clearance relative to the outer boundary and a second minimum clearance relative to the inner boundary,
   wherein the first minimum clearance is greater than the second minimum clearance.

4. The control system as claimed in claim 1, wherein the control system is configured to determine the minimum clearance or each minimum clearance such that the minimum clearance or each minimum clearance is increased in dependence based at least in part on the lateral velocity of the host vehicle increasing.

5. The control system as claimed in claim 1, wherein the control system is configured to determine the minimum clearance or each minimum clearance using a data structure storing lateral velocity values and corresponding minimum clearance values.

6. The control system as claimed in claim 1, wherein the control system is configured to:
   control generation of the steering wheel overlay signal to steer the host vehicle toward a predetermined distance from the at least one boundary.

7. The control system as claimed in claim 1, wherein the control system is further configured to determine the boundary or each boundary of the lane of travel by identifying a road marking or a road edge.

8. A vehicle comprising the control system as claimed in claim 1.

9. A computer-implemented method for controlling generation of a steering wheel overlay signal to control positioning of a host vehicle, the computer-implemented method comprising:
   receiving a curvature of a lane of travel;
   determining a position of the host vehicle in relation to at least one boundary of the lane of travel;
   determining a minimum clearance between the host vehicle and the at least one boundary based at least in part on the curvature of the lane of travel and based at least in part on a lateral velocity of the host vehicle within the lane of travel; and
   generating the steering wheel overlay signal for maintaining the host vehicle within the lane of travel based at least in part on the position of the host vehicle being determined to be closer to the at least one boundary than the minimum clearance.

10. Computer software that, when executed, is arranged to perform the computer-implemented method according to claim 9.

11. The control system as claimed in claim 5, wherein the control system is configured to select a first data structure if the curvature exceeds a predetermined threshold, and a second data structure if the curvature does not exceed the predetermined threshold.

12. The control system as claimed in claim 6, wherein the control system is configured to remove the steering wheel overlay signal based at least in part on the host vehicle being at least the predetermined distance from the at least one boundary.

13. The computer-implemented method as claimed in claim 9, comprising determining the minimum clearance such that it is reduced based at least in part on the curvature of the lane of travel increasing.

14. The computer-implemented method as claimed in claim 9, further comprising:
   determining an inner boundary of the lane of travel and an outer boundary of the lane of travel; and
   determining a first minimum clearance relative to the outer boundary and a second minimum clearance relative to the inner boundary;
   wherein the first minimum clearance is greater than the second minimum clearance.

15. The computer-implemented method as claimed in claim 9, comprising determining the minimum clearance or each minimum clearance such that the minimum clearance or each minimum clearance is increased based at least in part on the lateral velocity of the host vehicle increasing.

16. The computer-implemented method as claimed in claim 9, comprising determining the minimum clearance or each minimum clearance using a data structure storing lateral velocity values and corresponding minimum clearance values.

17. The computer-implemented method as claimed in claim 16, comprising selecting a first data structure if the curvature exceeds a predetermined threshold, and a second data structure if the curvature does not exceed the predetermined threshold.

18. The computer-implemented method as claimed in claim 9, comprising:
   controlling generation of the steering wheel overlay signal to steer the host vehicle toward a predetermined distance from the at least one boundary.

19. The computer-implemented method as claimed in claim 18, comprising:
   removing the steering wheel overlay signal based at least in part on the host vehicle being at least the predetermined distance from the at least one boundary.

20. The computer-implemented method as claimed in claim 9, comprising determining the boundary or each boundary of the lane of travel by identifying a road marking or a road edge.

* * * * *